United States Patent
Peach et al.

(10) Patent No.: US 9,021,327 B2
(45) Date of Patent: Apr. 28, 2015

(54) DYNAMIC PACKET REDUNDANCY FOR A FREE SPACE OPTICAL COMMUNICATION LINK

(71) Applicant: Harris Corporation, Melbourne, FL (US)

(72) Inventors: Robert C. Peach, Rockledge, FL (US); Alan J. Michaels, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 237 days.

(21) Appl. No.: 13/770,204

(22) Filed: Feb. 19, 2013

(65) Prior Publication Data

US 2014/0233960 A1 Aug. 21, 2014

(51) Int. Cl.
*H04L 1/00* (2006.01)
*H04L 1/18* (2006.01)
*H04L 12/00* (2006.01)
*H04B 10/112* (2013.01)

(52) U.S. Cl.
CPC ............. *H04L 12/00* (2013.01); *H04L 1/1819* (2013.01); *H04L 1/1845* (2013.01); *H04L 1/1812* (2013.01); *H04L 1/1816* (2013.01); *H04B 10/1129* (2013.01)

(58) Field of Classification Search
CPC ... H04L 1/1819; H04L 1/0061; H04L 1/1845; H04L 1/0003; H04L 1/004; H04L 1/1887; H04L 1/08; H04L 1/1812; H04L 1/1825; H03M 13/6306; H03M 13/09
USPC ................................................ 714/748, 746
See application file for complete search history.

(56) References Cited

U.S. PATENT DOCUMENTS

| | | | |
|---|---|---|---|
| 5,867,290 A | 2/1999 | Dutt et al. | |
| 6,731,878 B1 | 5/2004 | Britz et al. | |
| 7,007,217 B2 * | 2/2006 | Fujii et al. | 714/748 |
| 7,127,669 B2 | 10/2006 | Platenberg et al. | |
| 7,277,644 B2 | 10/2007 | Johnson et al. | |
| 7,644,187 B2 | 1/2010 | Klish, II | |
| 7,782,861 B2 | 8/2010 | Reda et al. | |
| 2002/0046380 A1 * | 4/2002 | Tomaru et al. | 714/751 |
| 2004/0199846 A1 * | 10/2004 | Matsumoto et al. | 714/748 |
| 2007/0005248 A1 * | 1/2007 | Averill et al. | 701/301 |
| 2009/0100310 A1 * | 4/2009 | Yoo et al. | 714/748 |
| 2010/0122135 A1 * | 5/2010 | Lida et al. | 714/748 |
| 2010/0199152 A1 * | 8/2010 | Ver Steeg | 714/776 |
| 2011/0099446 A1 * | 4/2011 | Murakami | 714/748 |
| 2011/0314351 A1 * | 12/2011 | Tada et al. | 714/751 |
| 2012/0041761 A1 * | 2/2012 | Morii et al. | 704/201 |

* cited by examiner

*Primary Examiner* — James C Kerveros

(74) *Attorney, Agent, or Firm* — Robert J. Sacco, Esq.; Fox Rothschild LLP

(57) ABSTRACT

System (100) and methods (1100) for improving packet loss due to fast optical power fades in an FSO communication link (136). The methods involve: obtaining Channel Fade Statistics ("CFSs") for the FSO communication link; and analyzing CFSs to determine if Redundant Packet Transmission ("RPT") is required to mitigate fast optical power fading. If RPT is required, then first operations are performed at a data link layer (408) of a protocol stack (400) to generate first packets (600). Each packet has a sequence number (602) disposed between a data link layer header (502) and a network layer header (504). If RPT is not required, then second operations are performed at the data link layer to generate a second packet absent of the sequence number or alternatively having a sequence number equal to zero. Thereafter, the packet(s) is transmitted over the FSO communication link one or more times.

28 Claims, 12 Drawing Sheets

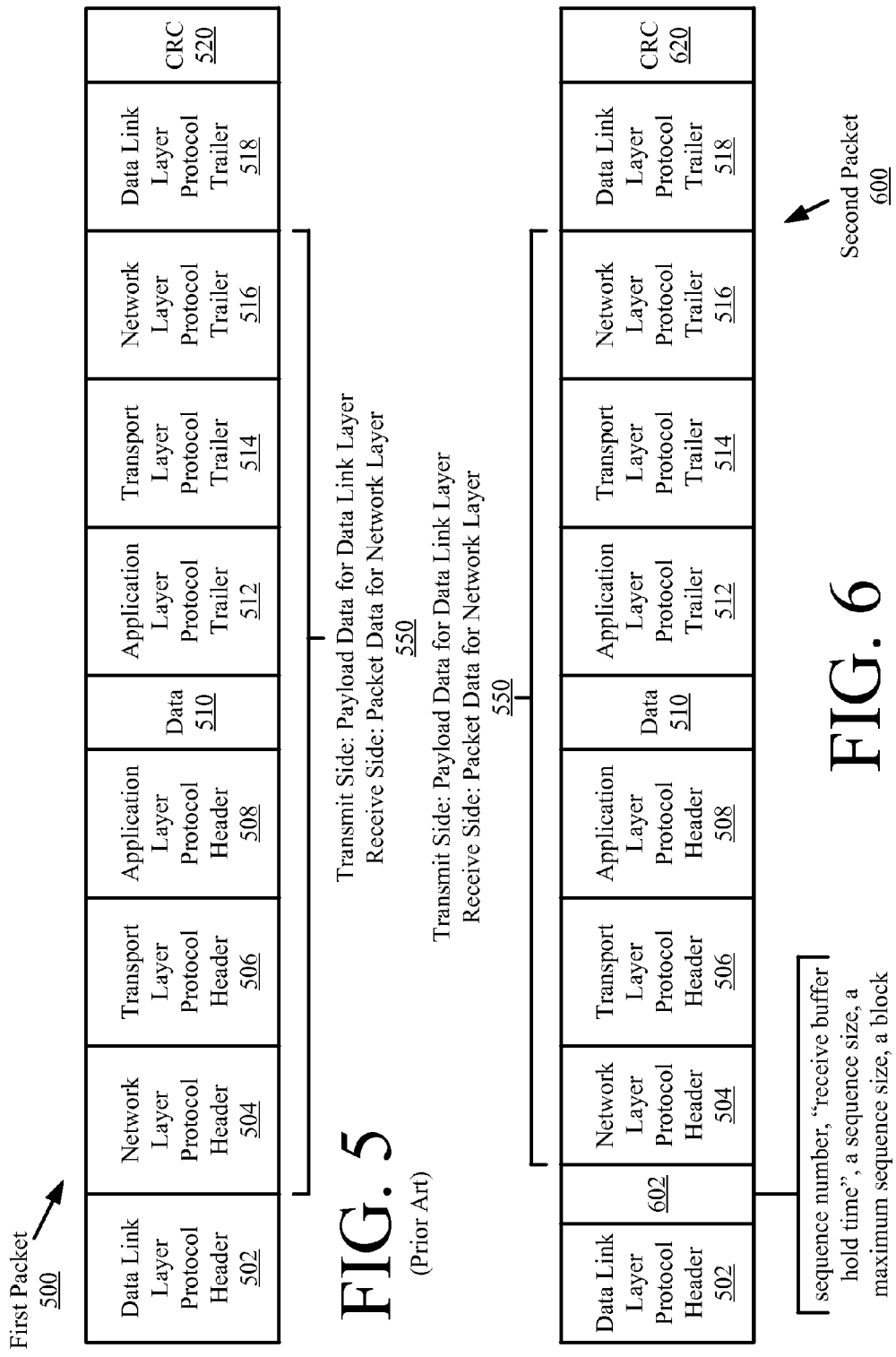

DYNAMIC PACKET REDUNDANCY FOR A FREE SPACE OPTICAL COMMUNICATION LINK

STATEMENT OF THE TECHNICAL FIELD

The inventive arrangements relate to systems and methods for transmitting data over a free space optical communication link. More particularly, the inventive arrangements concern systems and methods for improving packet loss due to fast optical power fades caused by atmospheric scintillation or turbulence in the free space optical communication link.

DESCRIPTION OF THE RELATED ART

Free Space Optical ("FSO") laser communication allows for smaller, lighter and more cost-effective communication systems at very high data transmission rates. As such, there is great interest in implementing Free Space Optical ("FSO") laser communication links within various types of communication systems. However, FSO communication links suffer from packet loss as a result of fast optical power fades caused by atmospheric scintillation or turbulence therein. Many solutions have been implemented for reducing the deleterious effects of atmospheric turbulence. Some of the solutions involve performing various operations at a physical layer of an Open System Interconnection ("OSI") protocol stack. Such solutions are hardware intensive, and therefore relatively expensive and complex. Other solutions employ an Automatic Repeat Request ("ARQ") technique. The ARQ technique is performed at a data link layer of the OSI protocol stack, and therefore may be less hardware intensive as compared to the solutions implementing physical layer operations since it may not require extra hardware. Although implementation of the ARQ technique may not require extra hardware, the firmware complexity in a Field Programmable Gate Array ("FPGA") handling the protocol will be complex due to the ACK/NACK sequence of operations. This information may be fed back over the same FSO channel used to communicate packets or over a Radio Frequency ("RF") channel. In the FSO feedback scenarios, the ARQ technique can fail since all or a portion of the feedback information may be lost as a result of the same fast optical power fades which caused the packet loss. In the RF channel scenarios, latency issues exist since the data transmit rate is slower on the RF channel than on the FSO channel.

SUMMARY OF THE INVENTION

The invention concerns implementing systems and methods for improving packet loss due to fast optical power fades in a Free Space Optical ("FSO") communication link. The methods involve obtaining channel fade statistics for the FSO communication link. The channel fade statistics can include, but are not limited to, a fade time, a fading frequency, a scintillation index, and/or channel turbulence parameters (e.g., temperature, wind direction and/or wind strength). The channel fade statistics can be determined using optical power meter information and/or channel turbulence information obtained from one or more sensors (e.g., temperature sensors and/or wind sensors). The channel fade statistics are then analyzed to dynamically determine if redundant packet transmission is required to mitigate fast optical power fading. In some scenarios, this determination can be made using one or more algorithms which are a function of the current health of the communication link and/or a predicted future health of the communication link. For example, if a mean fade margin decreases in value over time, then a determination can be made that re-transmissions are required to prevent future errors in the transmission of packets. Additionally or alternatively, if the number of dropped packets exceeds a threshold value, then a determination can be made that re-transmission are required to prevent further errors in the transmission of packets.

If it is determined that redundant packet transmission is required, then first operations are performed at a data link layer of a protocol stack to generate a plurality of first packets. Each first packet has at least a first sequence number disposed between a data link layer header and a network layer header. The first sequence number can have a value equal to or greater than one. In contrast, if it is determined that redundant packet transmission is not required, then second operations are performed at the data link layer to generate at least one second packet. The second packet can be absent of a sequence number or alternatively can have a sequence number with a value equal to zero. Thereafter, the first packets are transmitted over the FSO communication link at least two times, or the second packet is transmitted over the FSO communication link one time. Notably, the first operations and/or second operations can be performed at a Media Access Control ("MAC") sub-layer of the data link layer.

BRIEF DESCRIPTION OF THE DRAWINGS

Embodiments will be described with reference to the following drawing figures, in which like numerals represent like items throughout the figures, and in which:

FIGS. 5 and 6 each provide a schematic illustration of an exemplary packet.

DETAILED DESCRIPTION

Figure 1:
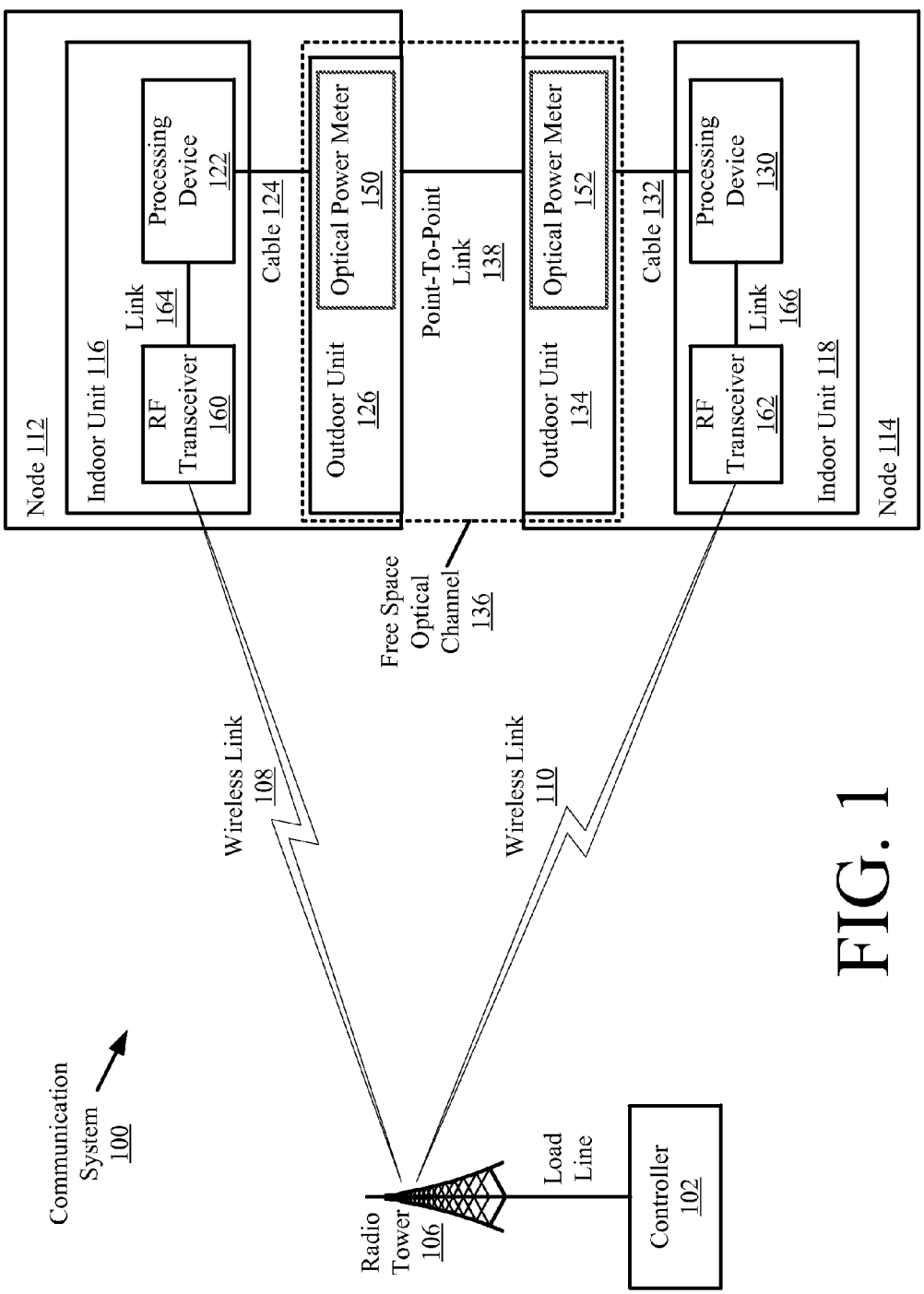
FIG. 1 is a schematic illustration of an exemplary communication system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-13C. Embodiments generally relate to systems and methods for improving packet loss due to fast optical power fades caused by atmospheric scintillation or turbulence in an FSO communication link. The methods generally involve obtaining channel fade statistics for the FSO communication link. The channel fade statistics are then analyzed to dynamically determine if redundant packet transmission is required to mitigate fast optical power fading. If it is determined that redundant packet transmission is required, then first operations are performed at a data link layer of a protocol stack to generate a plurality of first packets. Each first packet has at least a first sequence number disposed between a data link layer header and a network layer header. The first sequence number can have a value equal to or greater than one. In contrast, if it is determined that redundant packet transmission is not required, then second operations are performed at the data link layer to generate at least one second packet. The second packet can be absent of a sequence number or alternatively can have a sequence number with a value equal to zero. Thereafter, the first packets are transmitted over the FSO communication link at least two times, or the second packet is transmitted over the FSO communication link one time.

Notably, the above-described methods provide an FSO based system with a reduced packet loss without long latency issues which can be detrimental to interactive applications. The manner in which the packet loss is improved and long latency is avoided will become more evident as the discussion progresses. Still, it should be understood that fast optical power fades are mitigated by performing operations in a data link layer of a protocol stack, as opposed to at a physical layer of the protocol stack. Consequently, the present invention is less hardware intensive, costly and complex as compared to various conventional methods for mitigating fast optical power fades in an FSO channel. Also, unlike conventional ARQ techniques, the present invention does not require feedback of any information, and therefore is a more reliable solution (i.e., not subject to the failure or latency issues described in the background section of this application) and a less computationally complex solution (i.e., requires less complex firmware and/or embedded code) than the ARQ technique. Notably, since the present invention is generally implemented at the data link layer of the protocol stack, it is compatible with many known physical layer coding techniques, such as Optical Transport Network ("OTN") framing Forward Error Correction ("FEC") coding and Low Density Parity Check ("L-DPC") coding. It should also be noted that, although operations are performed at the data link layer in the present invention, many of the observables may still be derived from physical layer measurements. Also, embodiments of the present invention are not limited to the open loop implementations where feedback of information is not required. For example, in some scenarios, known closed loop techniques can be incorporated with the present invention. As such, the proposed techniques can be used in tandem with interleaving techniques and/or other existing data link layer robustness techniques without limitation.

Referring now to FIG. 1, there is provided a schematic illustration of an exemplary communication system 100. The communication system 100 includes a plurality of nodes 112, 114 configured to communicate with other nodes via a wireless communication link 108, 110 and/or a Point-To-Point ("PTP") link 138. The wireless communication link 108, 110 couples each node 112, 114 to a controller 102 via a radio tower 106. Accordingly, the controller 102 is able to control one or more operations of the nodes 112, 114. The PTP link 138 can include, but is not limited to, a bi-directional FSO channel 136. The FSO channel 136 can transmit packets at a super high bandwidth (e.g., 10-100 Gbps) that no other wireless technology can offer. However, packet loss may occur as a result of fast optical power fades caused by atmospheric scintillation or turbulence in the PTP link 138. Advantageously, the nodes 112, 114 are configured to reduce such packet loss while avoiding long latency which is detrimental to interactive applications. The manner in which the packet loss is improved and long latency is avoided will become evident as the discussion progresses.

As shown in FIG. 1, each node 112, 114 includes an Indoor Unit ("IDU") 116, 118 and an Outdoor Unit ("ODU") 126, 134. ODU 126, 134 may be located on the top of a building or a tower, while IDU 116, 118 may be disposed within the building or tower. Although each node 112, 114 is shown as comprising a single IDU and ODU, the invention is not limited in this regard. Each node 112, 114 can include one or more IDUs and ODUs. Also, in some scenarios, a portion of the IDU 116, 118 may be disposed outside the building or tower. For example, the RF transceiver 160, 162 may be located external to a building or tower. As such, the communication link 164, 166 can include an electrical cable or a fiber optic cable. Similarly, in some scenarios, a portion of the ODU 126, 134 may be disposed inside the building or tower. For example, an Optical Power Meter ("OPM") 150, 152 of the ODU 126, 134 may be disposed inside the building or tower. Still, the exemplary architecture illustrated in FIG. 1 is sufficient for understanding an exemplary implementation of the present invention.

Each IDU 116, 118 comprises a processing device 122, 130 configured to generate packets, process packets and communicate packets to the respective ODU 126, 134 via a cable 124, 132. In some scenarios, each cable 124, 132 includes an optical fiber along which optical signals may propagate. Each ODU 126, 134 forwards the packets to another ODU via the FSO channel 136.

Figure 2:
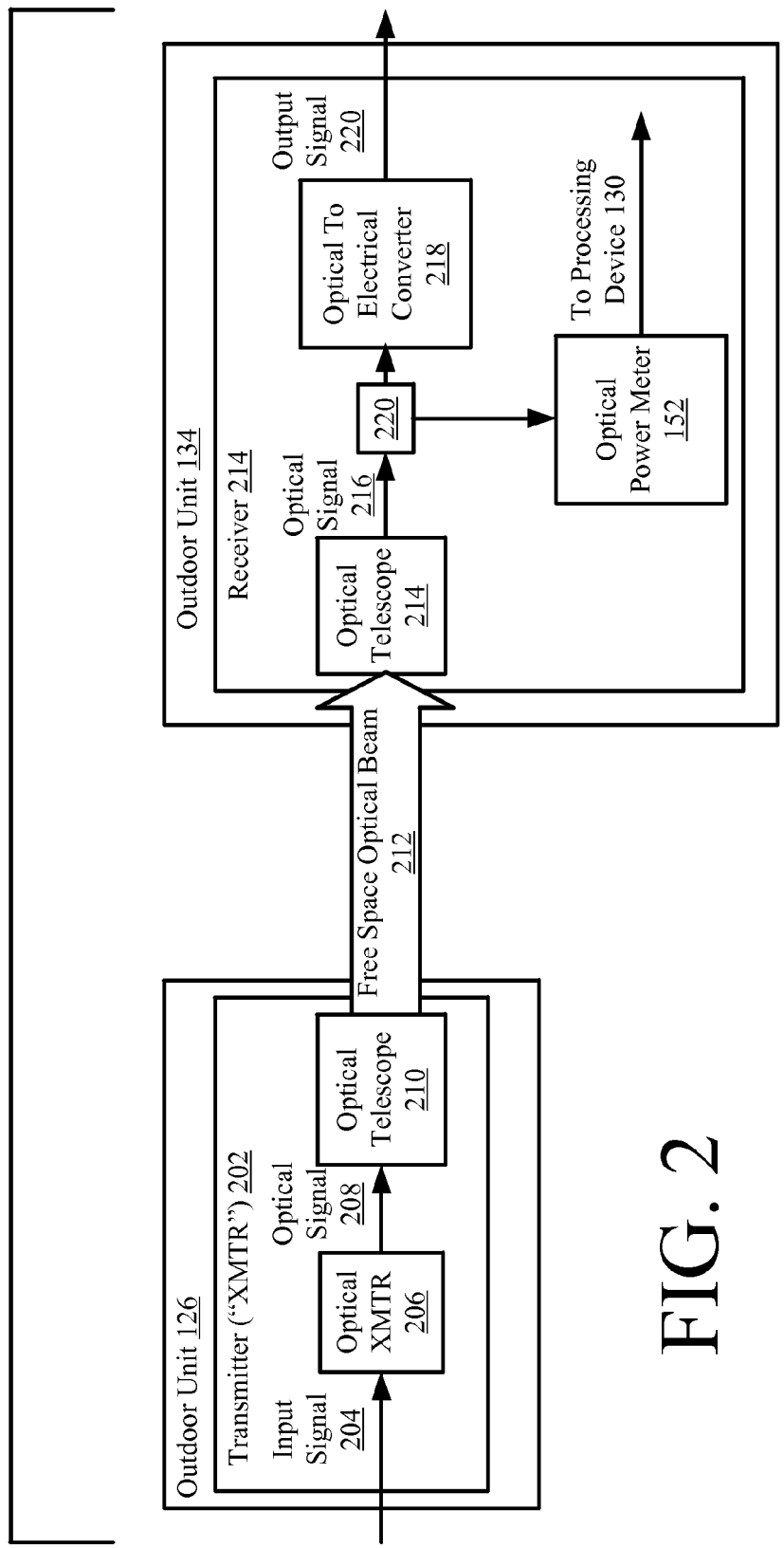
FIG. 2 is a schematic illustration of an exemplary free space optical channel.

As shown in FIG. 2, the FSO channel 136 is implemented by a transmitter 202 of the ODU 126 and a receiver 214 of the ODU 134. The transmitter 202 comprises an optical transmitter 206 and an optical telescope 210. The optical transmitter 206 can include, but is not limited to, a laser diode, a Light Emitting Diode ("LED") and/or another high speed modulated electro-optical device. During operation, the optical transmitter 206 converts input signal 204 to an optical signal 208 carried on a pre-defined wavelength λ. The optical telescope 210 then performs operations to transduce the optical signal 208 into an FSO beam 212 directed in the direction of receiver 214.

Receiver 214 comprises an optical telescope 214, an Optical Power Splitter ("OPS") 220, an Optical to Electrical Converter ("OEC") 218, and an OPM 152. The optical telescope 214 is configured to transduce the FSO beam 212 into an optical signal 216 carried on wavelength λ. The optical signal 216 is then passed to the OEC 218 and the OPM 152 via OPS 220. The optical signal 216 is detected by OEC 218. Thereafter, OEC 218 converts the optical signal 216 to an output signal 220. OEC 218 can include, but is not limited to, a photodiode, an avalanche photodiode, and/or a photo-gate. The optical signal 216 is processed by the OPM 152 so as to obtain channel fade information which can be used by the processing device 130 to generate channel fade statistics. The channel fade statistics can then be used to dynamically control operations of system 100 so as to mitigate fast optical power fades. The signal path (physical optical beam) post 214 can be free space or contained within optical fiber.

Figure 3:
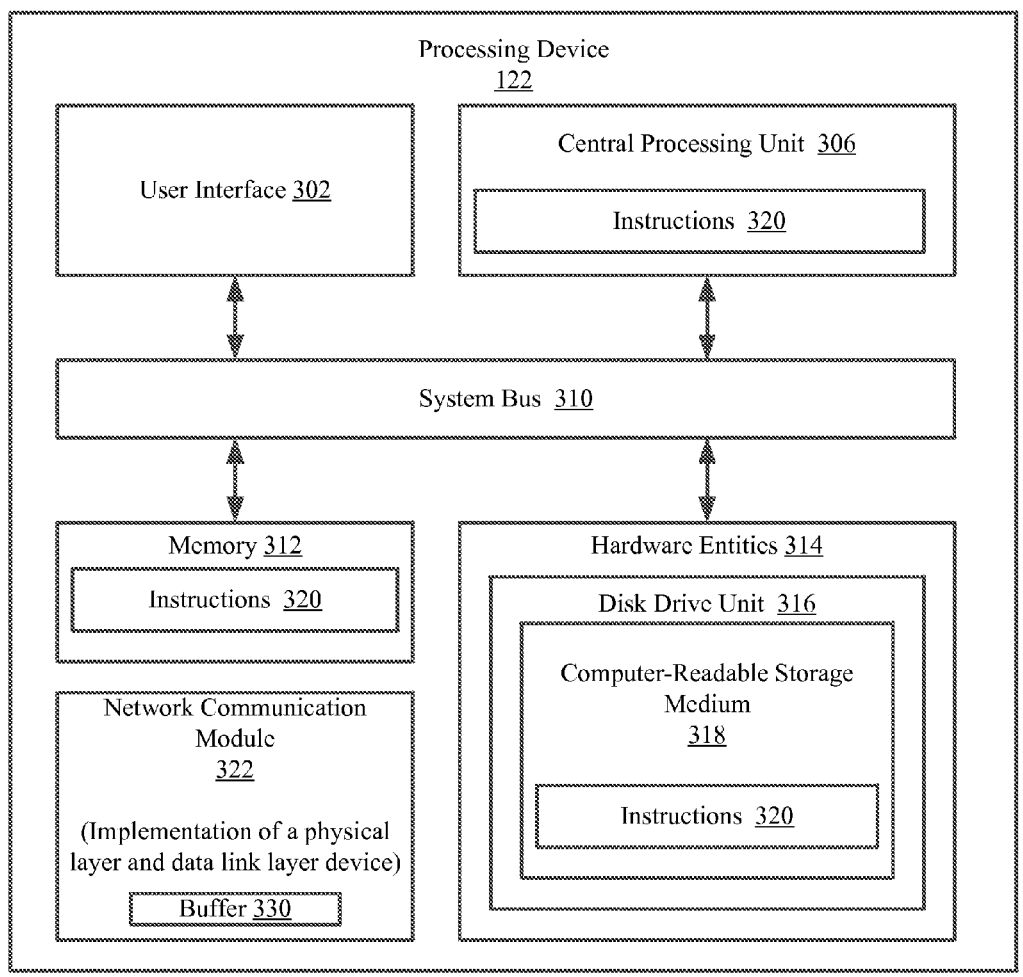
FIG. 3 is a block diagram of an exemplary processing device.

Referring now to FIG. 3, there is provided a block diagram of the processing device 122 of FIG. 1. Processing device 130 of FIG. 1 is the same as or similar to processing device 122. As such, the discussion of processing device 122 is sufficient for understanding processing device 130. Processing device 122 can include more or less components than that shown in FIG. 3. Some or all the components of the processing device 122 can be implemented as hardware, software and/or a combination of hardware and software. The hardware includes, but is not limited to, one or more electronic circuits.

Although the processing device 122 can include less or more components than that shown in FIG. 3, the architecture thereof is sufficient for facilitating the mitigation of fast optical power fading as described herein. In this regard, processing device 122 implements at least a portion of a method for improving packet loss due to fast optical power fades caused by atmospheric scintillation or turbulence in the FSO communication link. Exemplary embodiments of said method will be described below in relation to FIGS. 13A-13C.

Figure 4:
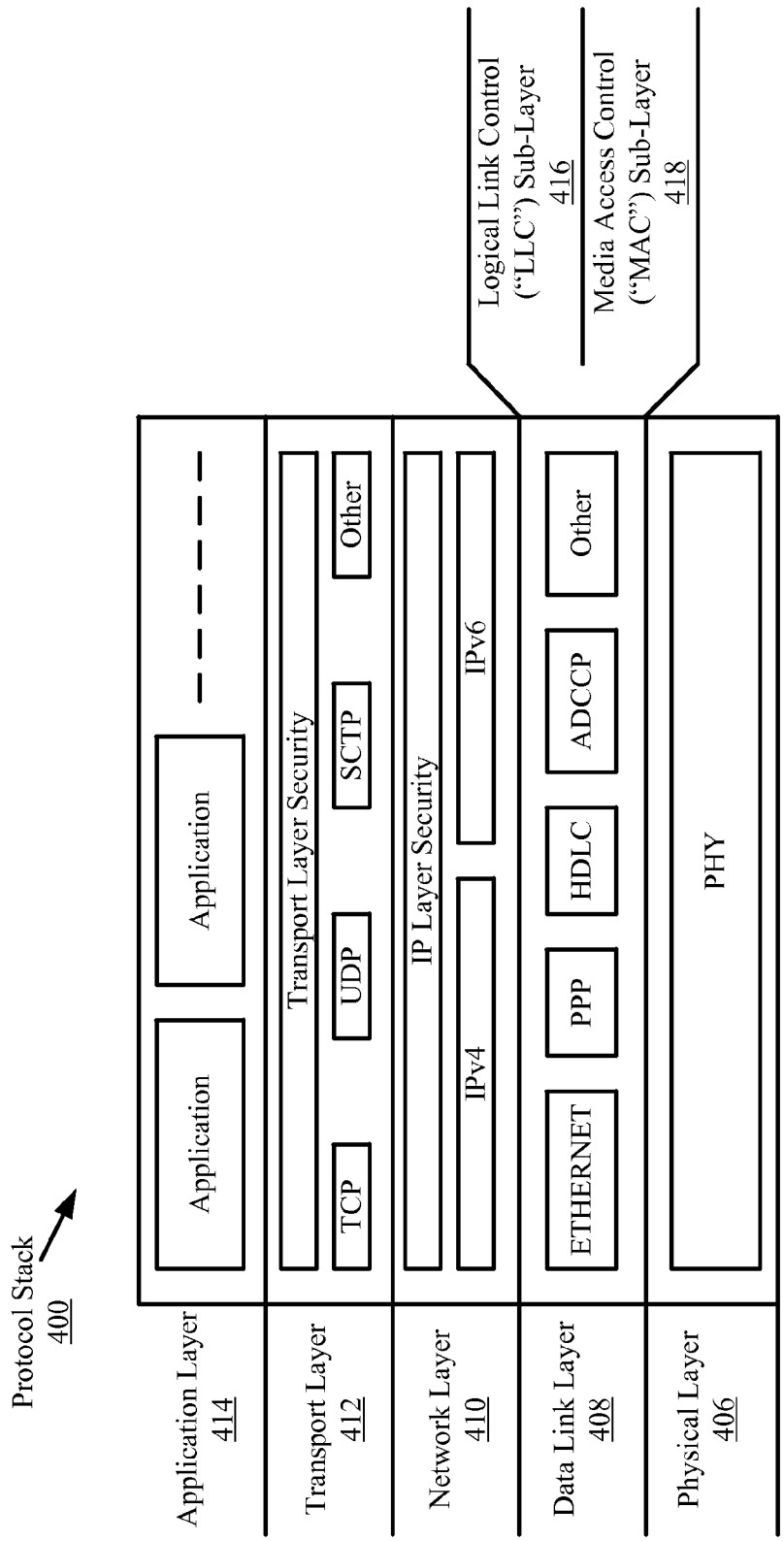
FIG. 4 is a schematic illustration of an exemplary protocol stack.

The processing device 122 can include any computing device implementing a protocol stack, such as an OSI protocol stack 400 shown in FIG. 4. Such computing devices include, but are not limited to, a notebook computer, a desktop computer, a laptop computer, a personal digital assistant, and a tablet PC. OSI protocol stacks are well known in the art, and therefore will not be described in detail herein. Still, it should be understood that the OSI protocol stack includes an application layer 414, a transport layer 412, a network layer 410, a data link layer 408 and a physical layer 406. The data link layer 408 includes a Logic Link Control ("LLC") sub-layer 416 and a MAC sub-layer 418. Each of the listed layers 406-418 is well know in the art, and therefore will not be described herein.

As shown in FIG. 3, the processing device 122 includes a Network Communication Module ("NCM") 322, a user interface 302, a Central Processing Unit ("CPU") 306, a system bus 310, a memory 312 connected to and accessible by other portions of processing device 122 through system bus 310, and hardware entities 314 connected to system bus 310. At least some of the hardware entities 314 perform actions involving access to and use of memory 312, which can be a Random Access Memory ("RAM"), a disk driver and/or a Compact Disc Read Only Memory ("CD-ROM").

Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the processing device 122. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the processing device 122 and that cause the processing device 122 to perform any one or more of the methodologies of the present disclosure. In some scenarios, the hardware entities 314 can include an FPGA, ASIC or other circuitry which implements at least the data link layer protocols of the protocol stack.

NCM 322 allows the processing device 122 to communicate packets to and from an ODU (e.g., ODU 126 of FIG. 1) via a cable (e.g., cable 124 of FIG. 1). In this regard, the NCM 322 is an implementation of a physical layer and data link layer device configured to mitigate fast optical power fades caused by atmospheric scintillation or turbulence in a PTP link (e.g., PTP link 138 of FIG. 1). Accordingly, the NCM 322 is configured to perform transmit side operations and receive side operations.

Figure 7:
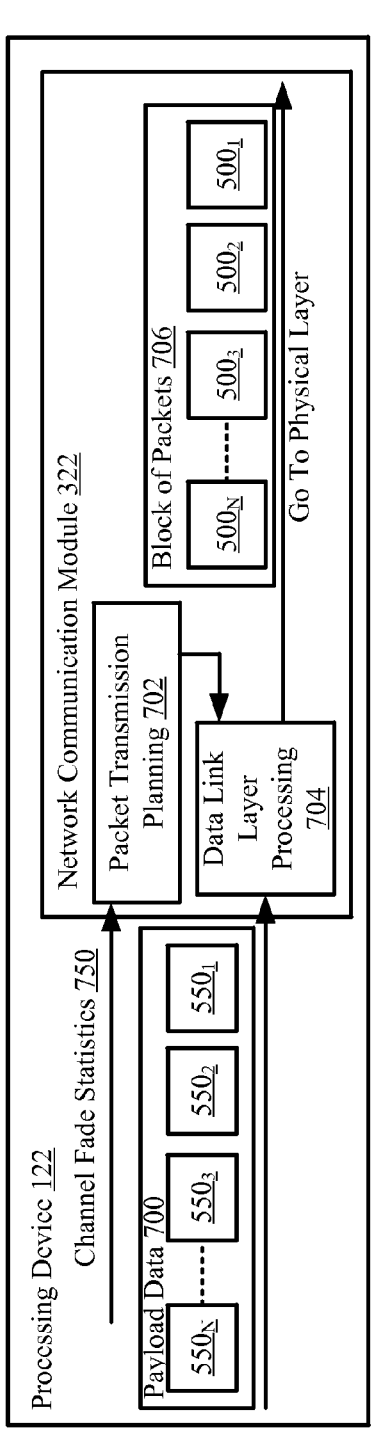
FIGS. 7-8 and 11 each provide a schematic illustration that is useful for understanding packet generation operations performed by a network communication module of a transmitting node.
Figure 8:
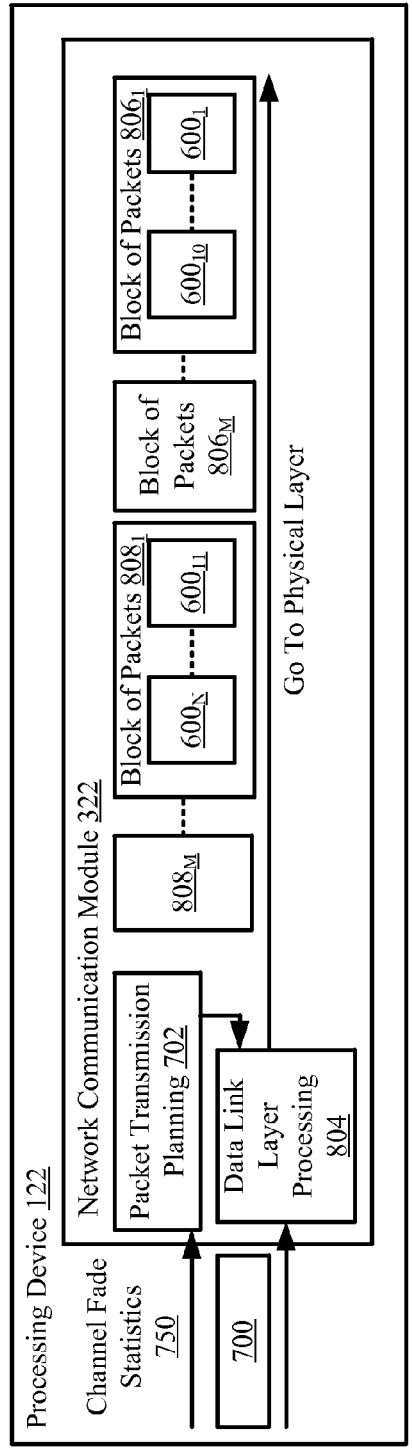
Figure 9:
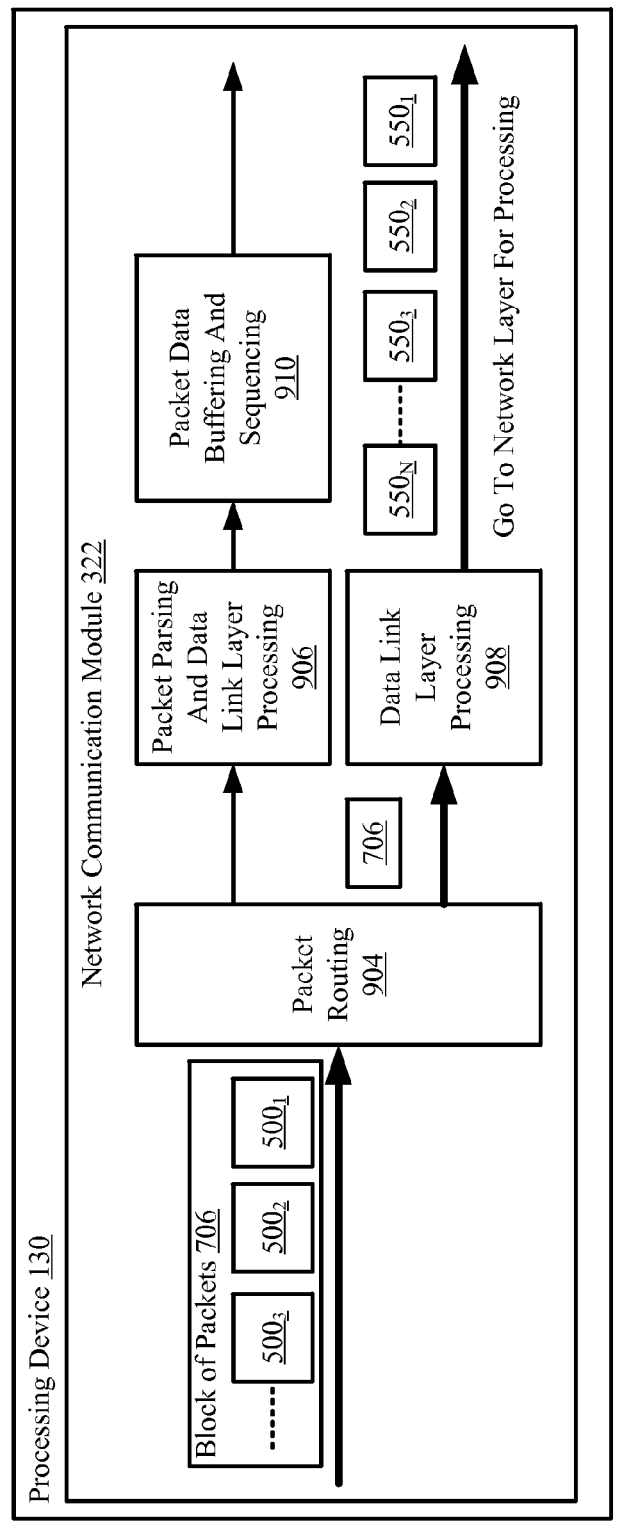
FIGS. 9-10 and 12 each provide a schematic illustration that is useful for understanding how packets are processed by a network communication module of a receiving node.
Figure 10:
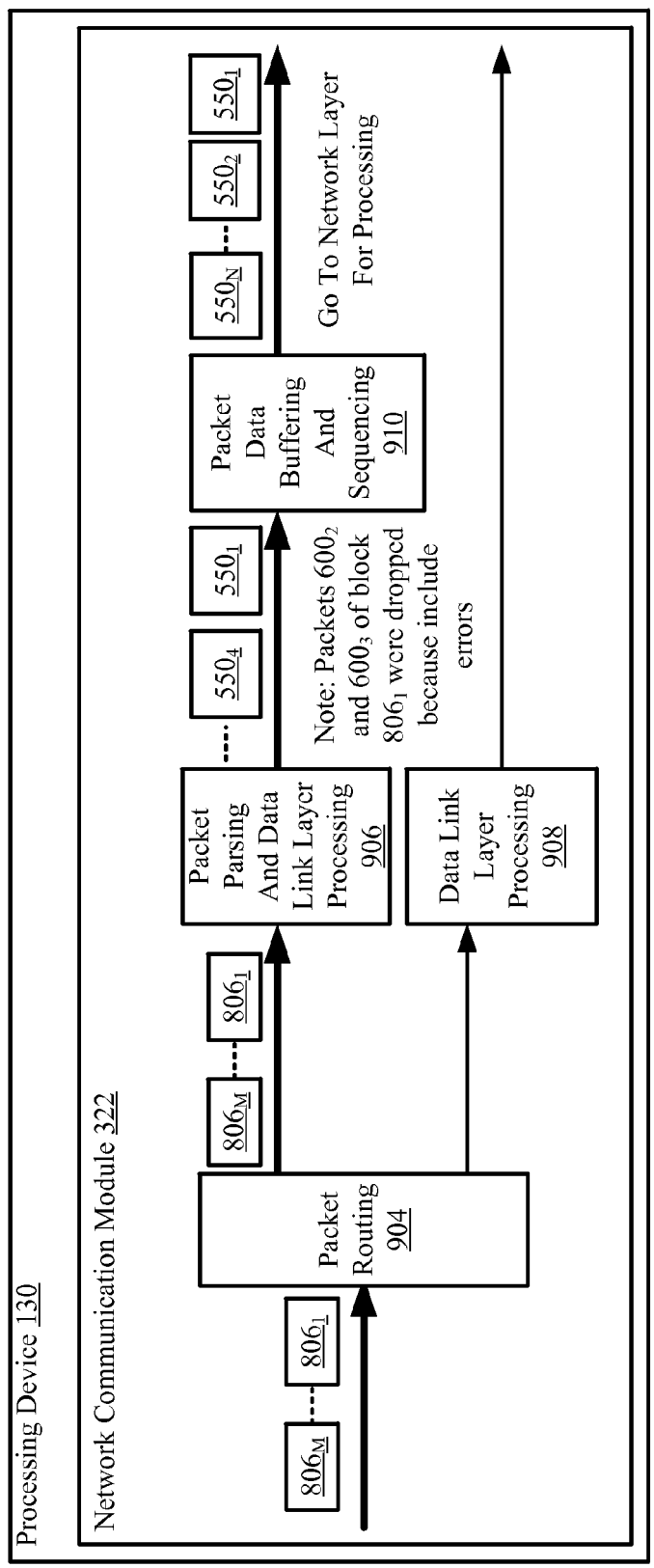
Figure 11:
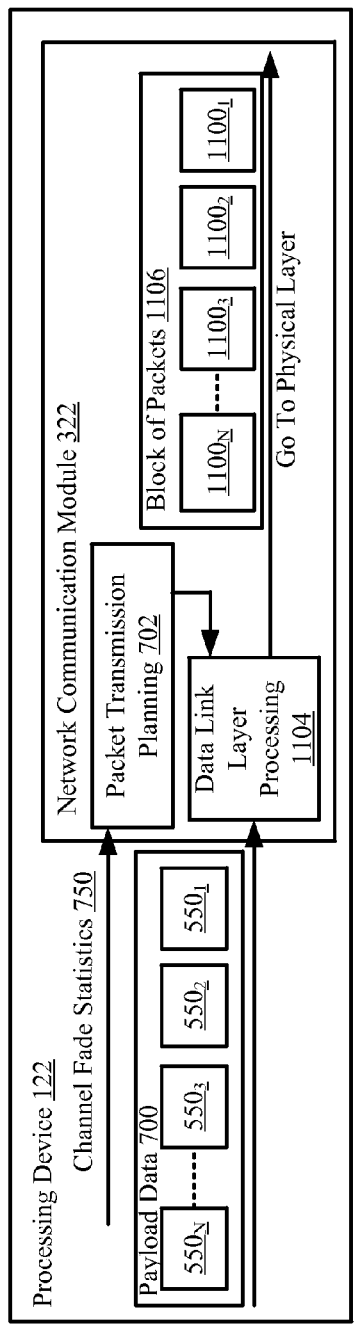
Figure 12:
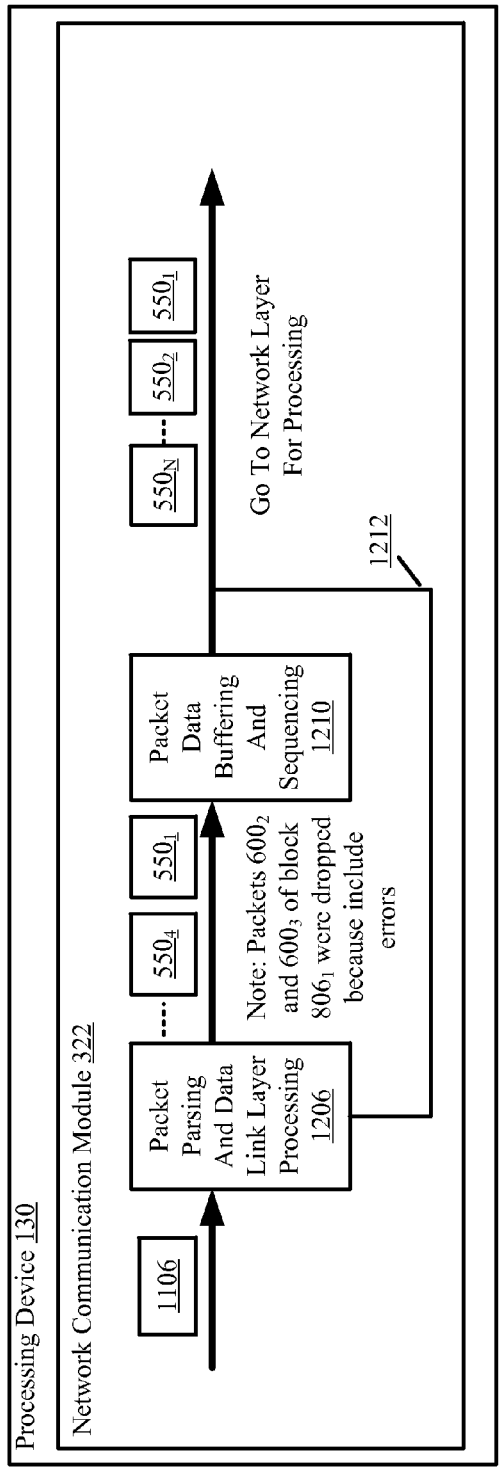

The transmit side operations are schematically illustrated in FIGS. 7-8 and 11. The receive side operations are schematically illustrated in FIGS. 9-10 and 12. FIGS. 7-8 and 9-10 illustrate transmit/receive side operations for a first exemplary implementation of the present invention. In contrast, FIGS. 11-12 illustrates transmit/receive side operations for a second exemplary implementation of the present invention. Embodiments of the present invention are not limited to the particularities of FIGS. 7-12. Other exemplary implementations of the present invention can be derived.

The first exemplary implementation will now be described in relation to FIGS. 7-10. As shown in FIGS. 7-8, the NCM 322 obtains channel fade statistics 750. The channel fade statistics 750 can include, but are not limited to, a fade time (e.g., a time at which a signal experiences fading), a fading frequency (e.g., the frequency component of a signal that experiences fading), a scintillation index (e.g., the normalized variance of irradiance fluctuations), and/or channel turbulence parameters. In some scenarios, the channel fade statistics 750 comprises a long term average of the fade time (e.g., a mathematical average of a set of times at which a signal experiences fading) that does not rely on real time power fluctuations.

The channel fade statistics 750 can be obtained using information generated by and received from one or more ODUs (e.g., ODUs 126, 134 of FIG. 1) and/or sensors (e.g., a temperature sensor and/or a wind sensor). In this regard, each ODU includes an optical power meter (e.g., optical power meters 150, 152 of FIG. 1). Optical power meters are well known in the art, and therefore will not be described herein. If information from an ODU of another node (e.g., node 114 of FIG. 1) is to be obtained, then such information can be communicated from that node via a wireless link (e.g., wireless link 108 of FIG. 1) and/or an FSO channel (e.g., FSO channel 136 of FIG. 1).

Subsequently, the NCM 322 performs packet transmission planning 702 to determine if redundant packet transmission is required to mitigate fast optical power fading. This determination is made by analyzing the channel fade statistics 750. In some scenarios, this determination can be made using one or more algorithms which are a function of the current health of the communication link and/or a predicted future health of the communication link. For example, if a mean fade margin decreases in value over time, then a determination can be made that re-transmissions are required to prevent future errors in the transmission of packets. Additionally or alternatively, if the number of dropped packets exceeds a threshold value, then a determination can be made that re-transmission are required to prevent further errors in the transmission of packets.

If it is determined that redundant packet transmission is not required, then the NCM 322 performs data link layer processing 704 to receive payload data $550_1, 550_2, 550_3, \ldots, 550_N$ from the network layer (e.g., network layer 410 of FIG. 4), generate first packets $500_1, 500_2, \ldots, 500_N$ using the received payload data, arrange the first packets into a block of first packets 706, and forward the block of first packets 706 to the physical layer (e.g., physical layer 406 of FIG. 4) for communication to an ODU (e.g. ODU 126 of FIG. 1). The ODU then transmits the block of first packets 706 over an FSO channel (e.g., FSO channel 136 of FIG. 1). The operations performed by NCM 322 and ODU in this regard will be discussed in more detail below in relation to FIGS. 13A-13C.

A schematic illustration of an exemplary first packet 500 is provided in FIG. 5. Each of the first packets $500_1, 500_2, \ldots, 500_N$ is the same as or similar to first packet 500. As such, the discussion of first packet 500 is sufficient for understanding first packets $500_1, 500_2, \ldots, 500_N$. As shown in FIG. 5, first packet 500 includes data 510 encapsulated with a plurality of headers 502-508 and trailers 518. Each of the listed headers and trailers is known in the art, and therefore will not be described herein. A Cyclic Redundancy Check ("CRC") value is appended to the end of the packet 500. CRC values are also well known in the art, and therefore will not be described herein. Still, it should be understood that the CRC value facilitates a determination, at the receive side, as to whether a transmitted packet comprises an error.

Referring again to FIG. 8, if it is determined that redundant packet transmission is required, then the NCM 322 performs data link layer processing 804 to generate second packets $600_1, \ldots, 600_{10}, 600_{11}, \ldots, 600_N$ and arrange the second packets into a plurality of blocks of second packets $806_1, 808_1$. The data link layer processing 804 can be performed at the MAC layer (e.g., MAC layer 418 of FIG. 4). Each block $806_1, 808_1$ includes a pre-determined number of second packets arranged in a sequential manner. For example, each block $806_1, 808_1$ includes ten packets $600_1, \ldots, 600_{10}$ or $600_{11}, \ldots, 600_N$. Embodiments of the present invention are not limited in this regard.

The second packets $600_1, \ldots, 600_{10}, 600_{11}, \ldots, 600_N$ can be generated using payload data 700 received from a network layer or a block of first packets 706. Therefore, in some scenarios, the NCM 322 simply encapsulates the payload data (e.g., payload data 550 of FIG. 5 and/or payload data $550_1, 550_2, 550_3, \ldots, 550_N$ of FIG. 8) for each packet with a data link layer header (e.g., data link layer header 502 of FIGS. 5-6), additional information (e.g., additional information 602 of FIG. 6) and a CRC value (e.g., CRC 620 of FIG. 6). In other scenarios, the NCM 322 will generate a packet of the type shown in FIG. 5, and then insert additional information (e.g., additional information 602 of FIG. 6) in between the data link layer header (e.g., header 502 of FIGS. 5-6) and the network layer header (e.g., header 504 of FIGS. 5-6). In this scenario, the CRC value (e.g., CRC 520 of FIG. 5) of the packet will be replaced with a newly computed CRC value (e.g., CRC 620 of FIG. 5).

After forming the block of second packets $806_1$ and $808_1$, the NCM 322 forwards a first block to the physical layer a specified number of times M, as shown by reference numbers $806_1, \ldots, 806_M$. M is an integer value equal to or greater than one. Next, the NCM 322 forwards a second block of second packets to the physical layer (e.g., physical layer 406 of FIG. 4) "M" number of times, as shown by reference numbers $808_1, \ldots, 808_M$. Notably, the sequence in which the packets $806_1, \ldots, 806_M, 808_1, \ldots, 808_M$ are passed to the physical layer is not limited to that shown in FIG. 8. Any sequencing scheme can be used in accordance with a particular application.

At the physical layer, the blocks of second packets $806_1, \ldots, 806_M, 808_1, \ldots, 808_M$ are communicated to an ODU (e.g., ODU 126 of FIG. 1). The ODU then transmits the blocks of second packets $806_1, \ldots, 806_M, 808_1, \ldots, 808_M$ over an FSO channel (e.g., FSO channel 136 of FIG. 1). The operations performed by NCM 322 and ODU in this regard will be discussed in more detail below in relation to FIGS. 13A-13C.

A schematic illustration of an exemplary second packet 600 is provided FIG. 6. Packets $600_1, \ldots, 600_N$ are the same as or similar to packet 600. As such, the discussion of packet 600 is sufficient for understanding packets $600_1, \ldots, 600_N$. As shown in FIG. 6, the second packet 600 is similar to the first packet 500 except that it includes additional information 602 disposed between the data link protocol header 502 and the network layer protocol header 504. The additional information 602 includes, but is not limited to, a sequence number, a "receive buffer hold time", a sequence size, a maximum sequence size, a block size, a maximum block size, and/or a block number. The sequence number allows the packets to be arranged in a proper sequence at the receive side. The "receive buffer hold time", a sequence size, a maximum sequence size, block size, a maximum block size, and/or a block number allow a receiving node (e.g., node 114 of FIG. 1) to determine when to flush a buffer thereof.

As shown in FIGS. 9-10, the receive side operations involve receiving at least one block of packets. The block of packets include packets of the type shown in FIG. 7 or FIG. 8. In either scenario, the NCM 322 performs optional packet routing 904 in response to the reception of a block of packets (e.g., the block of first packets 706 of FIG. 6 or the block of second packets $806_1, \ldots, 806_M, 808_1, \ldots,$ or $808_M$ of FIG. 8). The packet routing operations involve directing the block of packets to data link layer processing 908 when it includes packets of the type shown in FIG. 7 or to data link layer processing 906 when it includes packets of the type shown in FIG. 8. In some scenarios, the data link layer processing 906, 908 involves performing operations at the MAC layer (e.g., MAC layer 418 of FIG. 4). Also, the packet routing can be performed based on information received from a transmitting node (e.g., node 114 of FIG. 1) via a wireless link (e.g., wireless links 110, 108 of FIG. 1) or a PTP link (e.g., PTP link 138 of FIG. 1). This information can include, but is not limited to, an indication that packets of a type shown in FIG. 5 or FIG. 6 are going to be transmitted during a particular period of time.

In accordance with the data link layer processing 908, data link layer operations are performed by the NCM 322 to parse at least the CRC value (e.g., CRC 520 of FIG. 5) from each packet (e.g., packet $500_1, 500_2, 500_3, \ldots, 500_N$ of FIG. 7) of the block of packets (e.g., block of packets 706 of FIG. 7). Other information can also be parsed from a packet at this time. For example, the data link layer protocol header (e.g., header 502 of FIG. 5) and the data link layer trailer (e.g., trailer 518 of FIG. 5) may also be parsed from the packet, along with the CRC value.

Each CRC value is then used to determine if the respective packet has an error. If the respective packet has an error, then it is dropped. In contrast, if the respective packet does not have an error, then the remaining packet data $550_1, 550_2, 550_3, \ldots,$ or $550_N$ is forwarded to the network layer 410 for further processing. Packet data $550_1, 550_2, 550_3, \ldots, 550_N$ is the same as or similar to packet data 500 of FIG. 5. Notably, in this scenario, only a single transmission of the block of packets 706 is received by the NCM 322. Therefore, the packet loss resulting from any dropped packet is not corrected via redundant packet transmission. The data link layer operations performed by NCM 322 in this regard will be discussed in more detail below in relation to FIGS. 13A-13C.

In accordance with the data link layer processing 906, data link layer operations are performed by the NCM 322 to parse at least a CRC value (e.g., CRC 620 of FIG. 6) from each packet (e.g., packet 600 of FIG. 6) of the block of packets. Other information can additionally be parsed from a packet at this time. For example, the data link layer protocol header (e.g., header 502 of FIG. 6), additional information (e.g., additional information 602 of FIG. 6) and a data link layer trailer (e.g., trailer 518 of FIG. 6) can be parsed from a packet, along with the CRC value. Alternatively, this "other information" may be parsed from a packet after error checking operations indicate that the packet is absent of any errors.

Each CRC value is then used to determine if the respective packet has an error. If the respective packet has an error, then it is dropped. In contrast, if the respective packet does not have an error, then the remaining packet data $550_1, 550_2, 550_3, \ldots,$ or $550_N$ is forwarded to a buffer (e.g., buffer 330 of FIG. 3) for packet data buffering 910. In some scenarios, the packet data is stored in the buffer in the sequence received thereat. Therefore, if a packet is dropped from a first block and not from a re-transmitted block, then the packets may be buffered in a non-sequential order. In this scenario, the NCM 322 may also perform sequencing operations 910 to arrange the packets in a proper sequence prior to being communicated to the network layer (e.g., network layer 410 of FIG. 4). The sequencing is achieved using the sequence numbers (e.g., additional information 602 of FIG. 6) parsed from the packets. Notably, in this scenario, the NCM 322 receives two or more transmissions of each block of packets. Consequently, the packet loss resulting from any dropped packet may be corrected by a re-transmission of the dropped packet. The data link layer operations performed by NCM 322 in this regard will be discussed in more detail below in relation to FIGS. 13A-13C.

Referring now to FIGS. 11-12, transmit/receive operations performed by the NCM 322 will be described in accordance with a second exemplary implementation of the present invention. As shown in FIG. 11, the transmit operations involve obtaining channel fade statistics 750. Subsequently, the NCM 322 performs packet transmission planning 702 to determine if redundant packet transmission is required to mitigate fast optical power fading. This determination is made by analyzing the channel fade statistics 750. The results of this determination is then used during data link layer processing 1104 to generate at least one block of packets 1106. Each packet $1100_1, 1100_2, 1100_3, \ldots, 1100_N$ is the same as or similar to packet 600 of FIG. 6. Accordingly, each packet $1100_1, 1100_2, 1100_3, \ldots, 1100_N$ includes additional information (e.g., additional information 602) between its data link layer header and network layer header. The additional information can include a sequence number. The value of the sequence number for each packet is determined based on the results of the determination made during the packet transmission planning 702. For example, if it is determined that redundant packet transmission is not required, then the sequence number of all of the packets $1100_1, 1100_2, 1100_3, \ldots, 1100_N$ has a value of zero. In contrast, if it is determined that redundant packet transmission is required, the sequence number of each packet $1100_1, 1100_2, 1100_3, \ldots, 1100_N$ has a value equal to or greater than one.

The manner in which the packets $1100_1, 1100_2, 1100_3, \ldots, 1100_N$ are generated is dependant on the particular application. For example, in some scenarios, the NCM 322 simply encapsulates the payload data $550_1, 550_2, 550_3, \ldots, 550_N$ for each packet with a data link layer header (e.g., data link layer header 502 of FIGS. 5-6), additional information (e.g., additional information 602 of FIG. 6) and a CRC value (e.g., CRC 620 of FIG. 6). In other scenarios, the NCM 322 will generate a packet of the type shown in FIG. 5, and then insert additional information (e.g., additional information 602 of FIG. 6) in between the data link layer header (e.g., header 502 of FIGS. 5-6) and the network layer header (e.g., header 504 of FIGS. 5-6). In this scenario, the CRC value (e.g., CRC 520 of FIG. 5) of the packet will be replaced with a newly computed CRC value (e.g., CRC 620 of FIG. 6).

As shown in FIG. 12, the receive side operations involve receiving at least one block of packets 1106. In response to the reception of a block of packets 1106, the NCM 322 performs packet parsing operations 1206 at the data link layer (e.g., data link layer 408 of FIG. 4) to parse at least a CRC value (e.g., CRC 620 of FIG. 6) from each packet $1100_1, 1100_2, \ldots, 1100_N$ of the block of packets 1106. In some scenarios, operations 1206 are performed at the MAC sub-layer (e.g., MAC sub-layer 418 of FIG. 4) of the data link layer. Also, other information may be parsed from each packet at this time. The other information can include, but is not limited to, a sequence number, a data link layer header (e.g., header 502 of FIG. 6), and/or a data link layer trailer (e.g., data link layer trailer 518 of FIG. 6). For example, a sequence number may additionally be parsed from the packet, along with the CRC value (e.g., CRC 620 of FIG. 6). Alternatively, the sequence number may be parsed from the packet after an error checking operation indicates that the packet is absent of any errors.

The error checking operations involve determining if a packet has an error using the CRC value. If the packet has an error, then it is dropped. If the packet does not have an error and the sequence number is equal to zero, then the remaining packet data $550_1, 550_2, 550_3, \ldots,$ or $550_N$ is forwarded directly to the network layer for further processing, as shown by path 1212.

Notably, in scenarios where the sequence numbers are equal to zero, packet data buffering and sequencing operations 1210 of the NCM 322 are bypassed. Also, the NCM 322 will not receive re-transmissions of each block of packets 1106. Consequently, the packet loss resulting from any dropped packet will not be corrected by a re-transmission of the dropped packet. The data link layer operations performed by NCM 322 in this regard will be discussed in more detail below in relation to FIGS. 13A-13C.

In contrast, if the packet is absent of errors and the sequence number has a value equal to or greater than one, then the remaining packet data $550_1$, $550_2$, $550_3$, . . . , or $550_N$ is forwarded to a buffer (e.g., buffer 330 of FIG. 3) for packet data buffering 1210. In some scenarios, the packet data is stored in the buffer in the sequence received thereat. Therefore, if a packet is dropped from a first received block and not from a re-transmitted block, then the packets may be buffered in a non-sequential order. In this scenario, the NCM 322 may also perform sequencing operations 1210 to arrange the packets in a proper sequence prior to being communicated to the network layer (e.g., network layer 410 of FIG. 4). The sequencing is achieved using the sequence numbers (e.g., additional information 602 of FIG. 6) parsed from the packets.

Notably, in scenarios where the sequence numbers are non-zero, the NCM 322 will receive two or more transmissions of each block of packets 1106. Consequently, the packet loss resulting from any dropped packet may be corrected by a re-transmission of the dropped packet. The data link layer operations performed by NCM 322 in this regard will be discussed in more detail below in relation to FIGS. 13A-13C.

Figure 13A:
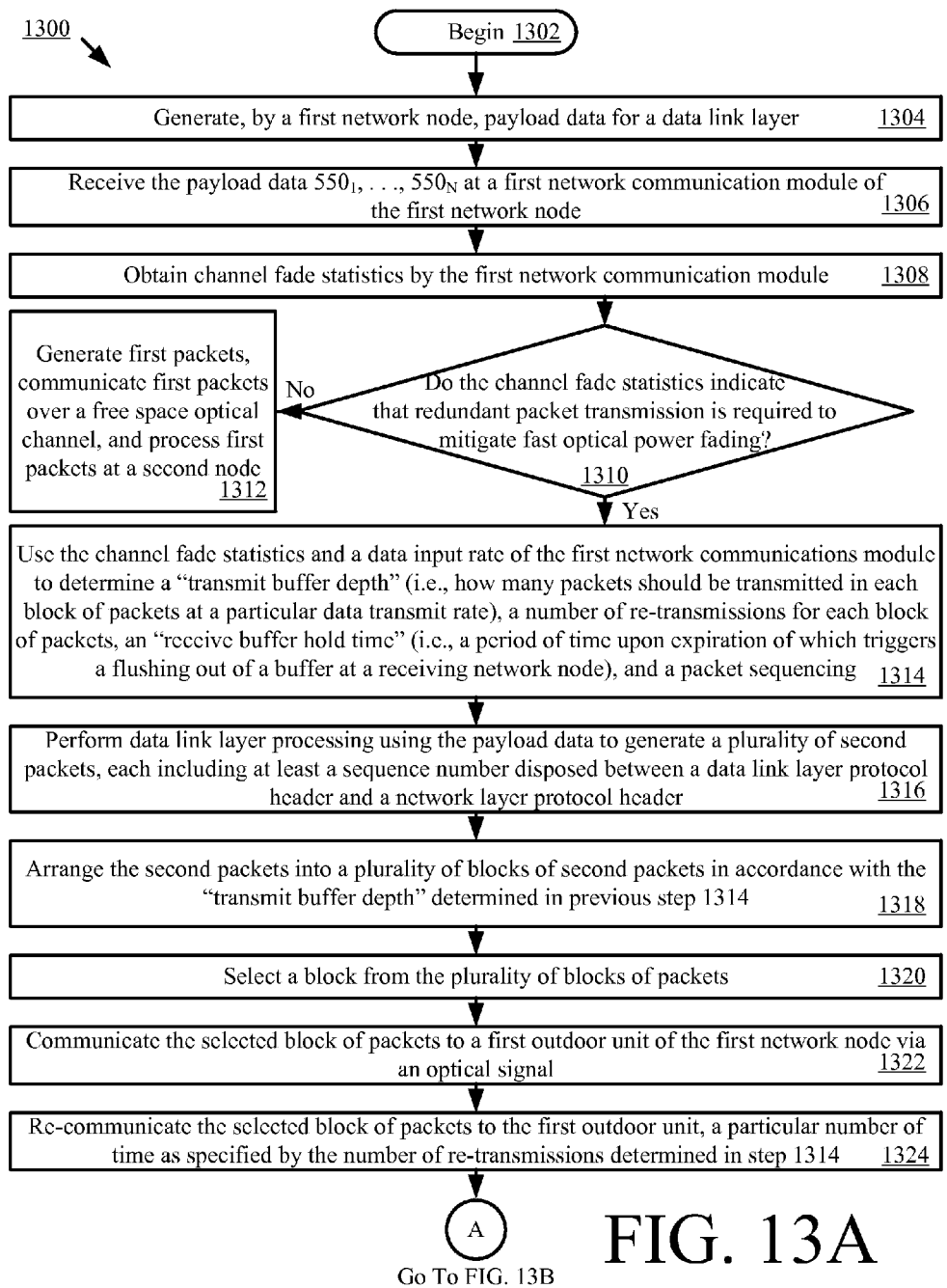
FIGS. 13A-13C collectively provide a flow diagram of an exemplary method for improving packet loss due to fast optical power fades caused by atmospheric scintillation or turbulence in the free space optical communication link.
Figure 13B:
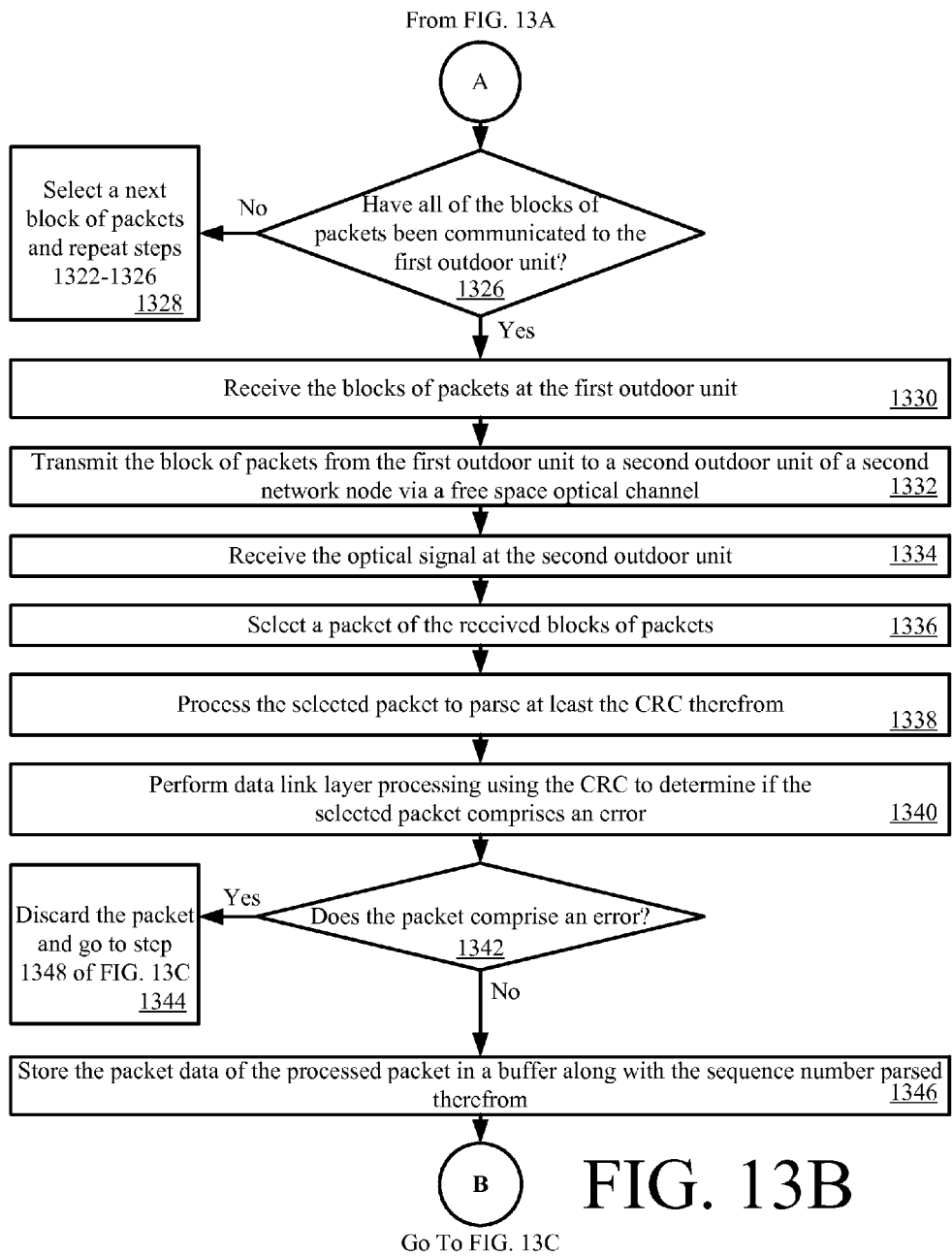
Figure 13C:
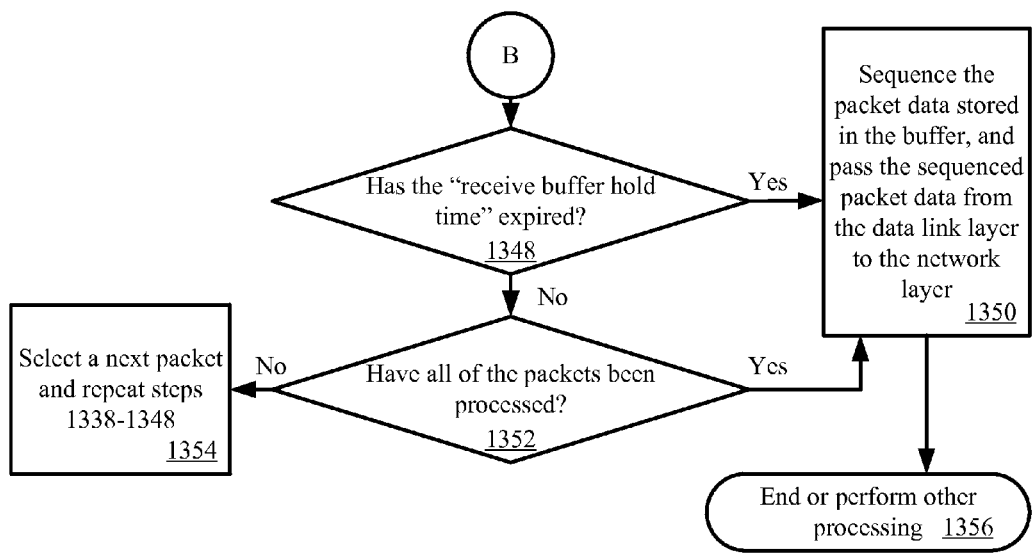

Referring now to FIGS. 13A-13C, there is provided a flow diagram of an exemplary method for improving packet loss due to fast optical power fades caused by atmospheric scintillation or turbulence in an FSO communication link. As shown in FIG. 13A, the method 1300 begins with step 1302 and continues with step 1304. In step 1304, a first network node (e.g., node 112 of FIG. 1) generates payload data (e.g., payload data 550 of FIG. 5 and/or payload data $550_1$, . . . , $550_N$ of FIGS. 7-8 and 11) for a data link layer. The payload data is then received at a first NCM (e.g., NCM 322 of FIG. 3) of the first network node, as shown by step 1306.

In a next step 1308, channel fade statistics (e.g., channel fade statistics 750 of FIGS. 7-8 and 11) are obtained by the first NCM. The channel fade statistics can include, but are not limited to, a fade time, a mean fade time, a fading frequency, and a scintillation index. The channel fade statistics are then analyzed such that a determination can be made as to whether redundant packet transmission is required to mitigate fast optical power fading. If it is determined that redundant packet transmission is not required to mitigate fast optical power fading [1310:NO], then method 1300 continues with step 1312. Step 1312 involves generating at least one first packet. Each first packet can include packet 500 of FIG. 5, packet $500_1$, . . . , or $500_N$ of FIG. 7, or packet $1100_1$, . . . , or $1100_N$ of FIG. 11 with a sequence number equal to zero. Step 1312 also involves communicating the first packet(s) over an FSO channel (e.g., FSO channel 136 of FIG. 1). Subsequently, the first packet(s) is(are) processed at a receive side node (e.g., node 114 of FIG. 1). If the first packet(s) is(are) of a type shown in FIG. 5 and FIG. 7, then the processing performed at the receive side node is the same as or similar to that described above in relation to FIG. 10. In contrast, if the first packet(s) is(are) of a type shown in FIG. 11, then the processing performed at the receive side is the same as or similar to that described above in relation to FIG. 12 (and more particularly reference numbers 1206 and 1212).

If it is determined that redundant packet transmission is required to mitigate fast optical power fading [1310:YES], then method 1300 continues with steps 1314. In step 1314, the channel fade statistics and other information are used to dynamically determine various packet transmission parameters. The other information can include, but is not limited to, a data input rate of the first NCM. The packet transmission parameters can include, but are not limited to, a "transmit buffer depth", a number of re-transmissions for each packet and/or block of packets, an "receive buffer hold time", and a packet sequencing. The "transmit buffer depth" specifies how many packets should be transmitted in each block of packets at a particular transmit rate. The "receive buffer hold time" specifies the period of time upon expiration of which triggers a flushing out of a buffer (e.g., buffer 330 of FIG. 3) at a receiving network node (e.g., node 114 of FIG. 1). The packet sequencing specifies the order in which the packets and/or blocks of packets should transmitted and/or re-transmitted from the first network node (e.g., network node 112 of FIG. 1).

Upon completing step 1314, data link layer processing is performed by the first NCM in step 1316. In this regard, the first NCM uses the payload data (e.g., payload data 550 of FIG. 5 and/or payload data $550_1$, . . . , $550_N$ of FIGS. 7-8) to generate a plurality of second packets (e.g., packet 600 of FIG. 6, packets $600_1$, . . . , $600_N$ of FIG. 8, or packets $1100_1$, . . . , $1100_N$ of FIG. 11). Each of the packets includes a sequence number (e.g., sequence number 604 of FIG. 6) residing between a data link layer protocol header 502 and a network layer protocol header 504. Each sequence number has a value equal to or greater than one. Each packet can additionally include a sequence size, a maximum sequence size, a block size, a maximum block size, a block number, and/or an "receive buffer hold time".

Next, in step 1318, the second packets are arranged into a plurality of blocks of second packets (e.g., blocks of second packets $806_1$, $808_1$ of FIG. 8 or blocks of packets 1106 of FIG. 11) in accordance with the "transmit buffer depth" determined in previous step 1314. Once the blocks of second packets have been formed at the data link layer (e.g., data link layer 408 of FIG. 4), they are passed to the physical layer (e.g., physical layer 406 of FIG. 4). At the physical layer, step 1320 is performed.

In step 1320, a block of second packets is selected. Next, in step 1322, the selected block of second packets (e.g., block of second packets $806_1$ of FIG. 8 or block of packets 1106 of FIG. 11) is communicated to a first ODU (e.g., ODU 126 of FIG. 1) of the first network node via an optical signal. Advantageously, the selected block of second packets is re-communicated to the first ODU a particular number of times as specified by the number of re-transmissions determined in previous step 1314, as shown by step 1324. Thereafter, the method 1300 continues with a decision step 1326 of FIG. 13B.

In step 1326, a decision is made as to whether all of the blocks of packets have been communicated to the first ODU. If all of the blocks of second packets have been communicated to the first ODU, then step 1328 is performed where a next block of packets is selected and steps 1322-1326 are repeated. If all of the blocks of the second packets have not been communicated to the first ODU, then step 1330 is performed. Step 1330 involves receiving the blocks of packets (e.g., block of packets $806_1$, . . . , $806_M$, $808_1$, . . . , $808_M$ of FIG. 8 or block of packets 1106 of FIG. 11) at the first ODU.

Subsequent to the reception of the blocks of second packets, step 1332 is performed. In step 1332, the blocks of second packets are transmitted from the first ODU to a second ODU (e.g., ODU 134 of FIG. 1) of a second network node (e.g., node 114 of FIG. 1) via an FSO channel (e.g., FSO channel 136). At the second network node, receive side operations are performed. The receive side operations are performed in steps 1336-1354 of FIGS. 13B-13C.

In step 1336, a packet of the received block of packets is selected. The selected packet is then processed in step 1338 so as to parse at least a CRC (e.g., CRC 620 of FIG. 6) therefrom. Thereafter, the second network node performs data link layer processing using the CRC to determine if the selected packet comprises an error. If the selected packet comprises an error [1342:YES], then the packet is discarded and the method 1300 goes to step 1348 of FIG. 13C. Step 1348 will be described below. In contrast, if the selected packet does not comprise an error [1342:NO], then step 1346 is performed. Step 1346 involves parsing at least the sequence number from the remaining portion of the selected packet and storing the corresponding packet data (e.g., packet data 500 of FIG. 5 or packet data $550_1, \ldots,$ or $550_N$ of FIGS. 7-8 and 12) in a buffer along with the sequence number parsed from the selected packet. Upon completing step 1346, a decision step 1348 of FIG. 11C is performed.

In step 1348, it is determined whether the "receive buffer hold time" has expired. Notably, in some scenarios, step 1348 can additionally or alternatively involve determining when to flush a buffer based on the "receive buffer hold time", a sequence size, a maximum sequence size, block size, a maximum block size, and/or a block number. Each of the listed criteria can be parsed from one or more packets.

If the "receive buffer hold time" has expired [1348:YES], then step 1350 is performed where the packet data is arranged in a proper sequence based on the sequence numbers associated therewith. Also, the sequenced packet data is passed from the data link layer (e.g., data link layer 408 of FIG. 4) to the network layer (e.g., network layer 410 of FIG. 4). Subsequently, step 1356 is performed where the method 1300 ends or other processing is performed.

If the "receive buffer hold time" has not expired [1348:NO], then a decision step 1352 is performed. In step 1352, it is determined whether all of the packets have been processed. If all of the packets have not been processed [1352:NO], then step 1354 is performed. In step 1354, a next packet is selected. Also, steps 1338-1348 are repeated. If all of the packets have been processed [1352:YES], then step 1350 is performed where the stored packet data is arranged in a proper sequence. Also, the sequenced packet data is passed from the data link layer (e.g., data link layer 408 of FIG. 4) to the network layer (e.g., network layer 410 of FIG. 4). Subsequently, step 1356 is performed where the method 1300 ends or other processing is performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for improving packet loss due to fast optical power fades in a Free Space Optical ("FSO") communication link, comprising:
    obtaining, by a network node, channel fade statistics for the FSO communication link, where the channel fade statistics are determined using information specifying at least one of an optical power parameter of the FSO communication link and an environmental parameter;
    analyzing, by the network node, the channel fade statistics to dynamically determine if a redundant packet transmission is required to mitigate fast optical power fading;
    if it is determined that the redundant packet transmission is required, performing first operations, by the network node, at a data link layer of a protocol stack to generate a plurality of first packets, each having at least a first sequence number disposed between a data link layer header and a network layer header; and
    automatically transmitting the plurality of first packets from the network node over the FSO communication link at least two times without any request by another network node to transmit the plurality of first packets.

2. The method according to claim 1, further comprising performing second operations at the data link layer to generate at least one second packet absent of the sequence number, if it is determined that redundant packet transmission is not required.

3. The method according to claim 1, wherein the first sequence number has a value equal to or greater than one.

4. The method according to claim 3, further comprising performing second operations at the data link layer to generate at least one second packet having a second sequence number equal to zero, if it is determined that redundant packet transmission is not required.

5. The method according to claim 4, further comprising:
    processing the second packet, at a receiving device, to parse at least an error checking code therefrom; and
    analyzing the error checking code to determine if the second packet has an error therein;
    wherein the packet is dropped if it is determined that an error exists therein; and
    wherein at least a portion of the second packet is communicated directly from the data link layer to a network layer of a protocol stack, if it is determined that an error does not exist therein and the sequence number is equal to zero.

6. The method according to claim 1, wherein the first operations are performed at a MAC sub-layer of the data link layer.

7. The method according to claim 1, wherein the channel fade statistics comprise at least one of a fade time, a fading frequency, and a scintillation index.

8. The method according to claim 1, further comprising using at least one of optical power meter information and channel turbulence information to determine the channel fade statistics for the FSO communication link.

9. The method according to claim 1, further comprising using the channel fade statistics to dynamically determine at least one of a "transmit buffer depth", a number of re-transmissions for each of the plurality of first packets, an "receive buffer hold time", and a packet sequencing.

10. The method according to claim 9, further comprising arranging the plurality of first packets in a plurality of blocks, each having a size specified by the "transmit buffer depth".

11. The method according to claim 10, further comprising:
    transmitting the plurality of first packets over the FSO communication link; and re-transmitting the plurality of first packets over the FSO communication link in accordance with the number of re-transmissions determined based on the channel fade statistics.

12. The method according to claim 1, further comprising:
processing at least one packet of the plurality of first packets, at a receiving device, to parse at least an error checking code therefrom; and
analyzing the error checking code to determine if the packet has an error therein;
wherein the packet is dropped if it is determined that an error exists therein.

13. The method according to claim 12, further comprising storing at least a portion of the packet in a buffer along with a sequence number parsed therefrom, if it is determined that an error does not exist therein and the sequence number is equal to or greater than one.

14. The method according to claim 1, further comprising determining when to flush a receive side buffer based on at least one of the "receive buffer hold time", a sequence size, a maximum sequence size, a block size, a maximum block size, and a block number.

15. The method according to claim 1, wherein said channel fade statistics are obtained through an open-loop measurement process.

16. A system, comprising:
a first network node comprising an electronic circuit configured to
dynamically determine if a redundant packet transmission is required to mitigate fast optical power fading, based on channel fade statistics for a Free Space Optical ("FSO") communication link, where the channel fade statistics are determined using information specifying at least one of an optical power parameter of the FSO communication link and an environmental parameter,
if it is determined that the redundant packet transmission is required, perform first operations at a data link layer of a protocol stack to generate a plurality of first packets, each having at least a sequence number disposed between a data link layer header and a network layer header, and
automatically transmit the plurality of first packets over the communication link at least two times without any request by another network node to transmit the plurality of first packets.

17. The system according to claim 16, wherein the electronic circuit is further configured to perform second operations at the data link layer to generate at least one second packet absent of the sequence number, if it is determined that redundant packet transmission is not required.

18. The system according to claim 16, wherein the first sequence number has a value equal to or greater than one.

19. The system according to claim 18, wherein the electronic circuit is further configured to perform second operations at the data link layer to generate at least one second packet having a second sequence number equal to zero, if it is determined that redundant packet transmission is not required.

20. The system according to claim 19, further comprising a second network node configured to:
process the second packet to parse at least an error checking code therefrom;
analyze the error checking code to determine if the second packet has an error therein;
if it is determined that an error exists therein, drop the second packet; and
if it is determined that an error does not exist therein and the sequence number is equal to zero, communicate at least a portion of the second packet directly from the data link layer to a network layer of a protocol stack.

21. The system according to claim 16, wherein the first operations are performed at a MAC sub-layer of the data link layer.

22. The system according to claim 16, wherein the channel fade statistics comprise at least one of a fade time, a fading frequency, and a scintillation index.

23. The system according to claim 16, wherein the electronic circuit is further configured to use at least one of optical power meter information and channel turbulence information to determine the channel fade statistics for the FSO communication link.

24. The system according to claim 16, wherein the electronic circuit is further configured to use the channel fade statistics to dynamically determine at least one of a "transmit buffer depth", a number of re-transmissions for each of the plurality of first packets, an "receive buffer hold time", and a packet sequencing.

25. The system according to claim 24, wherein the electronic circuit is further configured to arrange the plurality of first packets in a plurality of blocks, each having a size specified by the "transmit buffer depth".

26. The system according to claim 25, wherein the electronic circuit is further configured to:
transmit the plurality of first packets over the FSO communication link; and
re-transmit the plurality of first packets over the FSO communication link in accordance with the number of re-transmissions determined based on the channel fade statistics.

27. The system according to claim 16, further comprising a second network node configured to:
process at least one packet of the plurality of first packets to parse at least an error checking code therefrom;
analyze the error checking code to determine if the packet has an error therein;
if it is determined that an error exists therein, drop the packet; and
if it is determined that an error does not exist therein and the sequence number is equal to or greater than one, store at least a portion of the packet in a buffer along with a sequence number parsed therefrom.

28. The system according to claim 27, wherein the second network node is further configured to determine when to flush the buffer based on at least one of the "receive buffer hold time", a sequence size, a maximum sequence size, a block size, a maximum block size, and a block number.

* * * * *